Patented Nov. 27, 1923.

1,475,580

UNITED STATES PATENT OFFICE.

ROBERT R. HENLEY, OF WASHINGTON, DISTRICT OF COLUMBIA, DEDICATED, BY MESNE ASSIGNMENTS, TO THE PEOPLE OF THE UNITED STATES.

CLARIFIED SERUM ANTITOXIN AND PROCESS OF MAKING THE SAME.

No Drawing.   Application filed June 21, 1922.  Serial No. 570,008.

(FILED UNDER THE ACT OF MARCH 3, 1883, 22 STAT. L., 625.)

*To all whom it may concern:*

Be it known that I, ROBERT R. HENLEY, a citizen of the United States, and an employee of the United States Department of Agriculture, residing at Washington, District of Columbia, have invented a certain new and useful Clarified Serum Antitoxin and Processes of Making the Same.

This application is made under the act of March 3, 1883, chapter 143, (22 Stat., 625), and the invention herein described and claimed may be used by the Government of the United States, or any of its officers or employees in the prosecution of work for the Government, or any person in the United States, without payment to me of any royalty thereon.

My invention relates to an improvement in the method of separating serum from the corpuscles of defibrinated blood, and the production by separation of the serum, by heat or by filtration or both, of a clarified serum freed from all inert suspended matter including corpuscles, débris, constituents and filterable and non-filterable micro-organisms. This process is particularly applicable to the separation of a clarified serum antitoxin from old, phenolized, hog cholera defibrinated blood antitoxin, and the description of the process that will be given applies particularly to the separation of a clear serum from old, phenolized hog cholera defibrinated blood antitoxin prepared as disclosed in Dorset Patent No. 823,110, but the process is not limited in its application to this material, but may be used to separate clarified serum from any blood, either old or fresh, phenolized or non-phenolized.

It is known that the protective principles and antibodies contained in the blood drawn from hogs which have been hyperimmunized against hog cholera, as described by Dorset Patent No. 823,110, reside exclusively in the serum of such blood. At the present time these protective principles or antibodies, or antitoxins, are prepared and marketed in either one of two forms: 1. The blood from the hyperimmunized hogs, is drawn, defibrinated, and suitable preservatives, such as phenol, added as disclosed in Dorset Patent No. 823,110. This product will be referred to as phenolized anti-hog-cholera defibrinated blood antitoxin. 2. The second form of antitoxin is the product known as clear serum and is also covered by Dorset patent. This clear serum is now generally prepared from the fresh, non-phenolized defibrinated blood-antitoxin, or fresh non-phenolized citrated, or oxalated plasma, by the process disclosed by Dorset and Henley, U. S. Patent No. 1,264,285. This process described by Dorset and Henley in U. S. Patent No. 1,264,285, is limited in its application to fresh non-phenolized defibrinated blood, or plasma and cannot be applied to old phenolized anti-hog-cholera defibrinated blood antitoxin, to secure a clear serum which can be sterilized. A process that will serve to clarify old phenolized anti-hog-cholera serum and at the same time give as a product a clarified serum, which may be concentrated and sterilized, and do this with the same simplicity and rapidity that characterizes the separation of clear serum from fresh defibrinated or citrated blood by the Dorset and Henley process, U. S. Patent No. 1,264,285, has been for a long time earnestly desired by serum producers. The invention herein described will fulfill this want and the process possesses the same rapidity and ease of operation that marks the method of Dorset and Henley, U. S. Patent No. 1,264,285, as applied to fresh defibrinated blood anti-toxin.

This process is in effect a modification of the Dorset and Henley process, U. S. Patent No. 1,264,285, which permits the application of the Dorset and Henley process to old phenolized defibrinated blood. The method differs from the Dorset and Henley process in that a gas or fluid of low boiling point, such as chloroform, is employed in addition to the agglutinine and salt employed in the above process, and may in fact be employed without the presence of the agglutinine and salt.

In fresh defibrinated blood antitoxin the cells, which are inert, are intact and are easily removed by the method of Dorset and Henley. In old defibrinated blood antitoxin the cells are in great part disrupted and the cell contents, for the most part hemoglobin, are distributed throughout the fluid. Neither agglutinine nor salt will assist in the removal of the dissolved constituents from the disrupted cells, but fluids of low boiling points such as chloroform will combine with the disrupted cell contents, particularly hemoglobin, to form an insoluble compound which may be removed from the blood without injuring or otherwise adversely affecting the serum constituents which carry the antitoxin, and thus the cells, cell débris and particularly the constituents of the disrupted cells, may be removed by suitable mechanical means, yielding a clarified serum which possesses all of the antibodies present in the original material. The addition of agglutinine or salt facilitates the rapid removal of the cell débris and intact cells, and so are in practice ordinarily employed, but the presence of these materials is not an essential for the practical operation of the process.

In general the process is operated by adding to defibrinated blood, preferably phenolized, a sufficient quantity of a chemical of low boiling point, to effect a precipitation of the hemoglobin. Agglutinine and salt added at this stage facilitate somewhat the later steps, but the addition of these materials is not essential. Following the precipitation of the hemoglobin, the precipitated hemoglobin is removed by suitable mechanical means, affording as a product a clarified serum which contains all of the protective antibodies present in the original defibrinated blood. This clarified serum may be further purified by pasteurization, or filtration through bacteria proof filters, or both, and may be preserved by the addition of suitable quantities of acceptable preservatives.

The process as practically operated consists of four steps and the description of each step follows:

*Step 1.—Addition of precipitants.*

A. Addition of vegetable agglutinine.—To 500 cc. of phenolized (0.5% phenol) defibrinated blood antitoxin, preferably chilled to about 40° C., 10 or 15 cc. of vegetable agglutinine are added, and the flask agitated by hand.

B. Addition of chloroform.—Immediately following A, 20 to 50 cc. of chloroform are added to the blood, and the contents agitated by hand.

C. Addition of salt.—Following completion of B 5 gms. of common salt, sodium chloride, are added, and the flask and contents transferred to a shaking machine.

In this process B is an essential step. A and C are alternative steps and their employment usually facilitates the subsequent step of separation.

*Step 2.—Shaking.*

The material following completion of step 1 is transferred immediately to a shaking machine of any type available and shaken until the blood becomes decidedly thick or clotted. Ten minutes' shaking usually suffices. After shaking the clot should be allowed to stand until serum exudes, or until the contents becomes definitely fluid.

*Step 3.—Separation of serum.*

The serum may be separated from the clot by sedimentation, filtration, or centrifugalization. In practise, either filtration or centrifugalization is employed.

A. Centrifugalization.—Any type centrifuge, continuous or bucket, may be employed and yields as product a clarified serum which contains the antitoxin and a densely packed clot which consists of inert cells, cell débris and cell constituents. This residue is discarded.

B. Filtration.—The clotted blood is poured on a paper supported by a suitable funnel or other support. The filtrate consists of the clarified serum, which contains the antibodies. The residue on the paper mechanically retains some adherent serum, and this is recovered by subjecting the residue to pressure in a suitable press. The pressings, after clarification by filtration, if necessary, are combined with the clarified serum obtained by direct filtration. The residue is discarded.

*Step 4.—Final procedure.*

The clarified serum separated in this way is ready for use in treating hogs with hog cholera, or it may be mixed with suitable antiseptics in order to preserve it, or it may be heated to a temperature of 58–60° C. for one-half hour in order to destroy vegetative micro-organisms, or it may be passed through bacteria-proof filters which will remove all micro-organisms, living or dead, that may have survived the heating. In case heating is practised, the antiseptic is added subsequent to the heating, but the antiseptic may be added prior to or following filtration.

Having described my invention I claim:

1. In the art of preparing a clarified serum from old phenolized defibrinated blood, the step comprising the addition to such blood of a chemical of low boiling point such as chloroform, and thereupon effecting the separation of a clarified serum from the clotted cell constituents and débris originally contained in the said defibrinated blood.

2. In the art of preparing clarified hog-cholera serum anti-toxin from old, phenolized, defibrinated blood hog cholera antitoxin, the step comprising the addition of chloroform to such antitoxin and thereupon effecting the separation of a clarified serum antitoxin from the inert cell constituents and débris originally present in said defibrinated blood.

ROBERT R. HENLEY.